United States Patent [19]

Williams

[11] 4,409,293

[45] Oct. 11, 1983

[54] WOOD COMPOSITES OF LOW FORMALDEHYDE EMISSION

[75] Inventor: James H. Williams, Louisville, Ky.

[73] Assignee: Borden, Inc., Columbus, Ohio

[21] Appl. No.: 416,574

[22] Filed: Sep. 10, 1982

[51] Int. Cl.³ .............................................. B32B 27/42
[52] U.S. Cl. ..................................... 428/524; 524/27; 524/593; 524/596; 524/597; 524/598; 524/843; 525/399; 528/259
[58] Field of Search ....................... 528/232, 242, 259; 524/27, 593, 596–598, 843; 525/399; 428/524

[56] References Cited

U.S. PATENT DOCUMENTS

| | | | |
|---|---|---|---|
| 1,790,461 | 1/1931 | Cherry | 528/259 |
| 1,865,398 | 6/1932 | Goldschmidt et al. | 528/162 |
| 2,346,999 | 4/1942 | Sandford et al. | 428/524 |
| 2,442,897 | 6/1948 | Loughborough | 428/524 |
| 3,102,108 | 8/1963 | Aebi et al. | 528/259 |
| 3,957,703 | 5/1976 | Ludwig et al. | 428/524 |
| 4,129,547 | 12/1978 | Noyes | 428/524 |
| 4,247,433 | 1/1981 | Schamberg et al. | 524/843 |

FOREIGN PATENT DOCUMENTS 4804472 4/1974 Australia .
529637 8/1956 Canada .

*Primary Examiner*—Lucille M. Phynes
*Attorney, Agent, or Firm*—Robbins & Laramie

[57] ABSTRACT

A process for bonding lignocellulosic material under heat and pressure, where the bonded lignocellulosic material is characterized by a low emission of formaldehyde, which comprises applying a binder to said lignocellulosic material, said binder comprising a urea-formaldehyde base resin having a ratio of formaldehyde to urea of 1.0:1-1.2:1, said base resin having essentially no free formaldehyde and said base resin when cured containing substantially more methylene groups than methylene ether groups, consolidating said lignocellulosic material and curing the binder.

31 Claims, No Drawings

WOOD COMPOSITES OF LOW FORMALDEHYDE EMISSION

BACKGROUND OF THE INVENTION

The present invention is directed to wood composites (or composites of lignocellulosic material) formed with the use of formaldehyde-containing binder which have a low emission of formaldehyde. The invention is also directed to a process for preparing these wood composites. More particularly, the invention is concerned with improved plywood, fiberboard, particleboard and the like which are characterized by reduced formaldehyde emission, and with process for preparing them.

Urea formaldehyde condensation products are widely used as adhesives and binders. Many particleboard plants are designed around the properties of urea formaldehyde resins. They have the virtues of low cost, rapid cure, processing convenience, and clear color. Very short press cycles can be achieved with urea formaldehyde adhesives; by adding a catalyst, the rate of cure can be adjusted to essentially any desired speed. Also, urea formaldehyde adhesives have "tack", causing adhesive-treated particles to stick to each other, so that mats made from a "tacky" furnish tend to be self-sustaining in shape, facilitating handling.

Dry process composition board is a common form of composite panel. It may be made from wood fibers. In the manufacture of the board, raw wood is broken down to a fibrous form, sprayed with an appropriate adhesive, and then formed into a mat by a sifting or dry forming technique. This mat is then subjected to a high pressure and an elevated temperature to compact the mat to the desired density, commonly 40–60 lbs./ft.$^3$. In this hot pressing operation, the high temperature causes the resin to harden, to form an adhesive bond between the fibers.

In the preparation of particles used to make particleboard, a variety of materials may be employed. The board may be formed from a homogeneous type of particles. That is, all of the particles may be flakes, or all of them may be fibers. The board may be formed from a single layer or it may be multilayered, with fine surface flakes applied over a core of coarse flakes, or there may be a coarse flake core having an overlay of fibers on each of its surfaces. Other combinations are also used.

In the manufacture of particleboard, an aqueous solution of the synthetic resin binder, usually urea formaldehyde, is sprayed on the wood particles in an amount of from about 6 to about 10 parts of resin solids per 100 parts of dry wood. The resin-treated particles are then formed into a mat, and compacted in a hot press to the desired density. This type of panel is usually made to have a density in the range from about 35 to about 45 lbs./ft.$^3$. Typically, the thickness of particleboard would fall in the range from about one-eighth inch to two inches.

This type of process is quite versatile. Materials that would otherwise be waste materials can be formed into desirable products. For example, planer shavings can be formed into useful particleboard by this process, used alone, or in combination with other wood particles.

The mat process has been refined and improved, so that it is now common to make a multiple ply board. For example, three forming heads may be used. Each head effects the placement of flakes, fibers, or particles that have had resin and wax sprayed onto them, on a moving wire, or caul plate. The first forming head lays down a fine surface material, the second lays down a coarser material for the center layer of the board, and the third head lays down another outer layer of fine surface material.

Urea formaldehyde resins were developed as adhesives for wood in the late 1930's and the early 1940's. In some of the early composite panel plants, formaldehyde fumes generated during and after the hot pressing procedure were noticeable. The idea eventually arose of adding raw urea to the resin, in an effort to tie up the free formaldehyde, and reduce emissions. In some cases a limited amount of urea was added to the resin solution just prior to spraying the particles, in the commercial production of particleboard.

In addition to the mat-forming hot pressing process, an extrusion process is now in use. In this process, a mixture of wood particles, resin, and a wax size is forced through a die to make a flat board. The extrusion process is commonly used for captive production by companies who produce the resulting composite panel for use in furniture cores.

Some modern processes make use of a combination of press curing with hot platens and heat generated by radio frequency electricity. This combination permits rapid curing with a minimum press time.

While the dry process techniques for manufacturing composite panels are entirely dependent on synthetic resin adhesives, there are wet process techniques that can be used to make panels without any synthetic resin adhesive. However, often in actual practice the manufacturer of a wet process panel such as a hardboard will add a small amount of a synthetic resin binder in order to improve the properties of the product so that it can be used in demanding applications. Often the proportion of resin binder used is on the order of one-tenth to one-twentieth of the proportion used in the dry process.

In the mat-forming stage of the wet process, a slurry of fibers is drained on a screen to form a wet mat. Often the mat is produced as an endless ribbon, and it is cut into the desired panel size for curing.

In the manufacture of hardboard, the wet mat is treated somewhat differently than is the case in the dry process. The wax emulsion, for example, is added in the wet end of the mat-forming machine. Enough emulsion, generally of paraffin wax, is used to add from about 0.5% to about 1.5% of wax to the fibers, dry basis. Similarly, when a resin binder is added in the wet process, it is generally added to the fiber slurry before the mat is formed. It may be precipitated onto the fibers by acidifying the slurry with alum.

Wet process techniques are often also used in the production of insulation board. This kind of product emphasizes a low density structure that combines thermal insulating and sound-absorbing properties in a composite panel type of product. With the addition of synthetic resins and other additives, the properties such as surface quality, strength, and moisture resistance of insulation boards can be improved.

Formaldehyde release is especially noticeable in particleboard and in insulation foams, both of which contain cured resin films with a very large surface area which enhances formaldehyde release. The cause for formaldehyde release is complex. It can stem from a variety of partly related sources such as free, unreacted formaldehyde in the resin, from formaldehyde dissolved in moisture on the wood product surface, where it readily dissolves, and its vapor pressure and its release rate change with changes in air and product humidity. In particleboard, it can come from free formaldehyde which was bound to wood cellulose during the hot press cycle, and which slowly hydrolyzes under the influence of the acidic humidity in the wood. It can result from the degradation of incompletely cured resin, or resin components, such as methylolurea, and finally it can result from bulk resin degradation.

Several paths have been explored over the last few years for reducing formaldehyde release. These include coating applications, chemical treatment before or after resin application, resin additives and new resin formulations. However, relatively little research has been conducted on new resin formulations.

The mole ratio of formaldehyde to urea used commercially has tended to drop over the years, but any reductions in this ratio have weakened the internal bond character of the wood products. A new generation of low odor resins is currently appearing on the market in which traditional reagents are used, but the synthesis is more carefully controlled. Some resin formulations are now programming formaldehyde and urea additions at two or more stages in the overall reaction. Other chemicals such as resorcinol and glyoxal have been used either to terminate the dimethylolurea or to react in the polymerization process.

SUMMARY OF THE INVENTION

The invention follows conventional practice in some respects. Thus, the lignocellulosic furnish used in the manufacture of particleboard, fiberboard, and other composite panels is often sprayed with a wax emulsion for sizing and lubricant purposes, at a rate that deposits from about 0.5% to about 1.5% by weight of wax based on the weight of the dry solid material in the furnish. The applied wax reduces the tendency of the finished board to imbibe liquid water. The urea formaldehyde binder is generally sprayed on the furnish in an amount in the range from 6% to about 10% of dry binder solids based on the dry (oven-dried) weight of the finished board. These process techniques are generally followed in the practice of the present invention.

According to the present invention, the urea-formaldehyde binder which is utilized in the process and products is a urea-formaldehyde base resin which has a molar ratio of formaldehyde to urea of 1.0:1–1.2:1 and preferably substantially 1:1. The liquid base resin contains essentially no free formaldehyde. The cured resin contains substantially more methylene groups (i.e. methylenediurea bridge linkages) than methylene ether groups (i.e. dimethylene ether bridge linkages). This liquid base resin can be chemically cross-linked or physically modified, as with a synthetic amorphorous silica, to yield new formulations that increase the physical properties of the final products while maintaining significantly low formaldehyde emissions. The base resin can be used alone, in combination with a cross-linking agent or with amorphorous silica, or in combination with both. In addition, the chemical formulation developed in this invention can be either catalyzed or uncatalyzed to produce a final product having bond strength equal to or better than unmodified resins while reducing formaldehyde emissions.

DETAILED DESCRIPTION OF THE INVENTION

When producing a composite panel such as particleboard by the mat process in accordance with a preferred embodiment of the invention, wood flakes, fibers or particles are sprayed with a solution of a binder which is urea-formaldehyde base resin having a molar ratio, defined herein as the ratio of formaldehyde to urea, of 1.0:1–1.2:1 with the preferred molar ratio being substantially 1:1.

The sprayed pieces of wood may be passed through a forming head to make a mat. Alternatively, multiple forming heads may be employed. For example, three forming heads may be used to produce three separate mats that can be juxtaposed for the production of a three ply board, the two outer heads being used to put down a fine surface material, and the inner head being used to put down a coarser material for the center layer of the board.

The choice of the raw material for the lignocellulosic component is based mainly on availability and cost. As is common in boardmaking manufacturing operations, the wood from which particles are produced may be in the form of logs that are unsuitable for conversion into lumber or plywood because they are too small, too crooked, or too knotty, or the like. When such logs are reduced to small particle form, defects are screened out.

The invention is useful in the production of board that is made from homogeneous lignocellulose material or from mixtures of different kinds of such material. A board may be made, for example, completely from wood particles, or completely from wood flakes, or from fibers, planer shavings, or the like, or from mixtures of these. Similarly, the board may be formed with multiple layers, with fine surface flakes and a core of coarse flakes, or it may have a coarse-flaked core with an overlay of fibers on each of its surfaces. Other combinations may also be produced.

Wood flakes are generally made by a machine that shaves off flakes of the wood in a direction such that the length of each flake is parallel to the wood grain. A normal size flake has dimensions such as $\frac{1}{4}''\times 1''$, with a thickness in the range from about 0.005" to about 0.075", depending upon the intended end use.

The cellulosic material may also be in the form of wood fibers. In the production of such fibers, wood chips are generally mechanically reduced to fiber form in an attrition mill. The fibers so produced are generally placed in the form of a pulp or water slurry containing from about 1% to 2% by weight of fiber. While chemical binders may sometimes be omitted in the production of composite panels from fibers, when a resin binder of the urea-formaldehyde type is employed, the present invention is useful.

The wood pieces employed in making the composite panel have some affinity for water and a tendency to absorb it. Water entering a composite panel tends to weaken it, may cause some disorientation of surface fibers, and increases the dimensional instability of the composite panel. To prevent this tendency to absorb water, a wax may be applied to the wood pieces to provide a built-in resistance in the composite panel to water absorption. The wax that is employed may be any wax that will do the job. It may be, for example, a crude scale wax or a microcrystalline wax. It is applied, generally, at a rate of from about 5% to about 15% by weight of the binder, and preferably about 10%, dry solids basis. When expressed in terms of oven-dried furnish solids, the amount of wax is from about 0.5% to about 1.5% of wax to wood.

The urea-formaldehyde base resin which is employed as the binder is a liquid base resin which has a molar ratio of 1.0:1–1.2:1. The preferred molar ratio is substantially 1:1, i.e. a molar ratio of 0.99–1.01:1. The base resin contains essentially no free formaldehyde. When the base resin has been cured, it contains substantially more methylene groups than methylene ether groups. This enables the cured resin to be hydrolytically stable and characterized by low emission of formaldehyde. The urea-formaldehyde base resin can be cured without the addition of acidic hardeners which further enhances its hydrolytic stability and reduced formaldehyde emission.

The urea-formaldehyde base resin is prepared in an acidic condensation reaction. In this process, urea is added to an acidic solution of formaldehyde at a rate such that the exotherm, intrinsic viscosity and mole ratio are controlled to a designated parameter and the final resin has a molar ratio of 1.0:1–1.2:1, preferably 1:1. More particularly, a formaldehyde solution is adjusted to an acid pH of 0.5–2.5 by the addition of an appropriate acid. Urea is slowly charged to the acidic formaldehyde solution to maintain a temperature of 50°–70° C. in the exothermic reaction. As a result, no additional heat is required. The pH is maintained at 0.5–2.5 throughout the addition of urea. The amount of urea added at this stage is such so that a formaldehyde:urea ratio of 2.9–3.1:1 is achieved. After the viscosity has obtained a Gardner viscosity within the range of T+–V+, the reaction mixture is neutralized by the addition of a base. Then a final charge of urea is made to obtain the proper urea-formaldehyde molar ratio.

The resulting urea-formaldehyde liquid base resin is hydrolytically stable, contains essentially no free formaldehyde, has a molar ratio of 1.0:1–1.2:1 and is characterized in that it contains a high degree of methylene groups (bridges) in the cured resin. The process for preparing this base resin is more fully described in copending application Ser. No. 416,573 filed concurrently herewith, entitled Hydrolytically Stable Urea-Formaldehyde Resins and Process for Manufacturing Them, incorporated herein by reference. The preferred base resin has a molar ratio of 1:1 and the following composition: 24.89 weight percent formaldehyde and 49.78 weight percent urea, with the remainder being primarily water.

The urea-formaldehyde base resin can be used alone, in combination with a cross-linking agent, or physically modified with a synthetic amorphorous silica. These latter choices increase the physical properties of the final products while maintaining low formaldehyde emissions. Generally, any compatible compound having two or more reactive functional groups may be used as a cross-linking agent. The preferred reactive functional group is

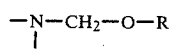

where R is an alkyl or hydroxyalkyl group of 1–24 carbons, preferably lower alkyl. Suitable cross-linking agents include, but are not limited to, trimethoxymethylmelamine, hexamethoxymethylmelamine,

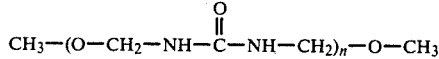

where n is an integer from 1–6 (methoxylated urea-formaldehyde resin), dimethoxymethyldihydroxyethylene urea, tetraethoxymethylglycoluril, dibutoxymethylurea, 5-ethyl-1-azo-,3,7-dioxabicyclo[3,3,0]octane and 5-hydroxymethyl-1-azo-3,7-dioxabicyclo[3,3,0]octane. The cross-linking agent is added to the base resin in the desired amount prior to spraying the wood pieces. The amount of cross-linking agent which is utilized ranges from 0 to 10 parts by weight per 100 parts by weight of urea-formaldehyde base resin. A surfactant may be necessary to assist in dissolving or dispersing the cross-linking agent in the aqueous solution of the base resin. A suitable surfactant is a sodium salt of an alkyl diphenyl oxide sulfonate, such as Dowfax 2A1 surfactant sold by Dow Chemical Co.

The amount of urea-formaldehyde base resin used generally will depend upon the characteristics required in the final product. For a high grade insulation board, the amount of binder used may be up to about 5% of resin solids based on dry finished board weight, and generally may be from about 2% to about 4%. For a good grade of particleboard, the amount of resin should be sufficient to provide from about 6% to about 10% dry resin solids based on the weight of the furnish for the composite panel. In a multi-layered board, often a lesser amount of resin will be used in the core than is used for the surface layers, such as, for example, 6% of resin solids for the core, and 10% of resin solids in the two surface layers. The added amount of resin in the surface layers imparts added strength and hardness as compared to the core. More resin than 10% can be used, but a greater amount presently is not cost efficient.

External catalysts may also be employed to assist in curing the urea-formaldehyde resin. Suitable catalysts include ammonium sulfate and ammonium chloride. When utilized, the external catalyst is added to the resin prior to spraying the wood pieces. The amount of external catalyst which can be utilized is in the ranges from 0 to 5 parts by weight per 100 parts of the urea-formaldehyde liquid base resin.

Hot pressing conditions will depend upon the thickness of the board as well as on resin characteristics and the presence or absence of a catalyst. A representative press cycle for the producton of a ¾" thick particleboard would be about 4–6 minutes at a press platen temperature of about 325° F. Where the press-curing uses a combination of hot platens and radio frequency heating, much more rapid curing occurs so that less press time is needed. Using this method of board curing, a board 1½" thick and having a density of 25 lbs./ft.³ can be produced in about 3 minutes of press time. In a conventional hot platen press, the time required might be from 25 to 30 minutes.

Particleboard prepared using the urea-formaldehyde base resin described above can be made so that it has significantly less residual formaldehyde than particleboard prepared using conventional urea-formaldehyde reisn, wihtout a significant loss in physical properties.

The invention will be demonstrated by the following examples. In these examples, and elsewhere throughout the specification, parts and percentages are by weight, and temperatures are degrees Celsius unless expressly indicated otherwise. The term "molar ratio" refers to the molar ratio of formaldehyde to urea, unless indicated otherwise.

EXAMPLE 1

Preparation of Urea-Formaldehyde Base Resin

The base resin is prepared as described in copending application Ser. No. 416,573. According to this process, an aqueous formaldehyde solution was assayed and found to contain 50% formaldehyde. 49.78 g. (0.83 moles) of this formaldehyde solution was charged to a reactor and agitation and stirring was initiated. The pH of the formaldehyde solution was adjusted to pH 1.0 using sulfuric acid. The temperature of the solution was raised to 50° C. 16.93 g. (0.282 moles) of urea was charged into the formaldehyde solution in 15 equal increments over a 15 minute time period. The pH was maintained at 1.0.

After the urea was charged, the mixture was stirred for 15 minutes to a Gardner viscosity of "T+". The pH of the reaction mixture was raised to pH 7.2 by the addition of 0.05 g. of a 50% sodium hydroxide solution and the necessary amount of triethanolamine. Then 32.85 g. (0.548 moles) of urea was charged to the reaction mixture. The pH was adjusted to 7.2 with triethanolamine and circulation was continued for 30 minutes. The reaction was then complete.

The urea-formaldehyde base resin was analyzed and found to have the following composition in weight percent: 24.89% formaldehyde, 49.78% urea, 0.06% sulfuric acid, 0.05% sodium hydroxide, and 0.33% triethanolamine with the remainder being water. There is essentially no free formaldehyde, i.e. no formaldehyde is detactable after 24 hours. The urea-formaldehyde base resin had a solids content of 62.52% and a molar ratio of 1:1.

The base resin was compared with a conventional resin as to free formaldehyde, methylol, methylene ether, and methylene, all based on total formaldehyde, as more fully described in said copending applicaton. The results are shown in Table I.

TABLE I

Structural Analysis of Two UF Resins Based on Total Formaldehyde Content

| | Base Resin of the Invention (1.0 F/U Mole Ratio) | | Conventional Resin (1.3 F/U Mole Ratio) | |
| --- | --- | --- | --- | --- |
| | Liquid | Cured | Liquid | Cured |
| Free Formaldehyde | — | — | 0.52% | — |
| Methylol | 51.08% | — | 43.83% | 2.83% |
| Methylene Ether | 21.09% | 28.07% | 29.00% | 44.34% |
| Methylene | 27.83% | 71.93% | 26.65% | 52.83% |
| Total Formaldehyde | 100.00% | 100.00% | 100.00% | 100.00% |

The base resin has more methylol and methylene functional groups in the liquid state than a liquid conventional resin (51.08% and 27.83% versus 43.83% and 26.65% respectively). After the base resin is cured, the methylene ether group content at 28.07% is minimized relative to the methylene function content at 71.93%. The cured conventional resin, however, shows only slightly more methylene, 52.83% than methylene ether function, 44.34%. In addition, the cured conventional resin contains 2.83% methylol functionality.

The data presented in Table I demonstrates that the new manufacturing procedure and new molar ratio of substantially 1:1 does change the chemical structure and skeleton of the resin relative to the conventional resins. This change is reflected in the structural relationship of the cured resin which has more methylene functionality than methylene ether or the summation of methylene ether and methylol groups. The hihgh degree of functionality in the base resin, therefore, not only contributes to its hydrolytic stability, but also to its low release of formaldehyde.

EXAMPLE 2

Comparative Demonstration of Particleboard Production

Particleboard was prepared using the resin of Example 1 and compared to particleboard prepared using two conventional resins, with a F/U molar ratio of 1.25:1 and a F/U molar ratio of 1.17:1. These two resins are regarded as low-fuming resins, i.e. have low emission of formaldehyde.

Southern Pine Core Furnish (approximate oven dry moisture content (M.C.) percent, 5.7%–6.8% determined by a Cenco Direct Reading Moisture Balance) was placed in a rotary drum blender (measuring 48" diameter by 24" wide) and continuously tumbled. The liquid resin was applied at a rate of 8.0% of dry resin solids per 100 parts of oven dry (O.D.) wood, with a spray nozzle producing a cone configuration pattern at approximately 7 psi atomizing pressure. The flow through the nozzle was at a rate of approximately 100 grams liquid resin/minute.

A wax emulsion (CASCOWAX EW-403E) was also applied 0.75% wax solids/O.D. wood weight) prior to resin application with a separate pump, at a flow rate of 60 grams of liquid emulsion per minute and an atomizing pressure of 25 psi. Boards were manufactured using resin with and without external catalysis. The catalyst was added to the resin prior to spraying at a rate of 2.0 solids parts of acid salt to 100 grams liquid resin.

The amount of untreated furnish used in blending was large enough to manufacture six laboratory board samples 14½" square, ⅝" (0.625") thick with an oven dry density of approximately 45 lbs/cu. ft. A mat was formed using the treated furnish and a forming box prior to pressing. The laboratory boards were pressed between 2 aluminum cauls (⅛" thick×18"×22"). Treated moisture content was determined on the Cenco Direct Reading-Moisture Balance.

The press used was a single opening press with a 12" hydraulic ram. The total press cycles were either 3.75 minutes or 3.0 minutes in duration. The press was closed with increasing pressure from 0–775 psi on the mat with ⅝" stops until closure (no daylight) occurs in approximately 1.0 to 1.5 minutes and then the pressure was reduced and held at 175 psi for the remainder of the cycle.

The boards (3 from each press cycle) were then cooled at room temperature. In the cooling process only 2 boards at each press cycle were stickered. The other boards (1 at each press cycle) were hot stacked and cut in half for special conditioning prior to testing.

The sample boards stickered for cooling, roughly 14½" square, were trimmed to a 12½" square and cut into two 5"×12½" strips and one 2"×12½" strip. The two 5"×12" strips were then cut into eight 5"×2¾" samples for residual formaldehyde testing and the single 2" strip from each of the four stickered boards were cut into six 2"×2" square samples for internal bond testing. The two single board samples (1 at each press cycle and hot stacked) were cut in half with one half going into an oven at 145° F. hot stacked for 48 hours and the other half going into a humidity cabinet (stickered to get better conditioning) with conditions set at 120° F./70% R.H. for 96 hours. After this separate conditioning, the boards in the 48 hour dry heat hot stack were stickered and allowed to cool for 72 hours at 70° F./50% R.H. The boards exposed to heat/humity were left stickered and allowed to cool for 48 hours at 70° F./50% R.H. After cooling these boards were cut into twelve 2"×2" samples.

The boards manufactured were tested for overdried density (O.D.), internal bond strength (original-no conditioning; after a 48 hour dry heat hot stack at 145° F.; and after a 96 hour heat/humidity conditioning period at 120° F. and 70% relative humidity), residual formaldehyde emissions according to the Feb. 24, 1982 National Particleboard Association (NPA) sanctioned 2 hour desiccator procedure, and a hydrolysis test used to determine any degradation in internal bonds after prolonged exposure to constant temperature and humidity.

The NPA sanctioned desiccator procedure was used to determine the amount of residual formaldehyde given off by particleboard and absorbed into a 25 ml sample of distilled water to give results in micrograms of formaldehyde per ml of water. The only modification to this method was the elimination of the 15 minute boil on the test tubes after the addition of the concentrated sulfuric acid to develop the colors prior to evaluation in the spectrophotometer. Due to a study which compared the boil and non-boil condition, there was no significant change in color development with the omission of the boil. This modification has speeded up the procedure.

The samples measuring 5"×2¾" were randomized at each of the specific press process conditions prior to being placed in the desiccator.

The density of the boards were determined after exposure to the desiccator method discussed above. Half of the 5"×2¾" samples were used to determine the oven dried (O.D.) density of the board samples. Eight samples per condition were used to obtain an average value according to NPA test procedures 4.4.2 and 4.4.3. The moisture content was determined according to NPA procedure 4.5.

Internal bond samples, measuring 2"×2", were tested in a Tinius Olson Universal Testing machine with a 24,000 pound load capacity. The internal bonds were tested according to procedure 4.7 of the NPA.

Four original internal bond samples measuring 2"×2", which were stickered after removal from the press and allowed to cool to room temperature, were tested first. Half of the unstickered boards were subjected to dry heat at 145° F. for 48 hours in order to accelerate any degradation in the resin bond. Following this conditioning, samples were stickered and allowed to cool for 72 hours at 70° F./50% R.H. Four 2"×2" samples were tested per each board.

The remaining unstickered boards were subjected to 96 hours of 120° F./70% R.H. conditioning in order to accelerate any hydrolysis (bond degradation) that may occur under extreme conditioning in a plant situation. Samples were cooled at 70° F./50% R.H. for 48 hours prior to testing four 2"×2" samples to determine if any long term bond degradation occurred after exposure.

Eight additional 2"×2" samples per each above condition were cut and set aside for the following test. Four of these samples were conditioned for one week at 70° F./50% R.H., four weeks at 70° F./90% R.H., and one week at 70° F./50% R.H. (or until a constant weight was obtained). Samples were then tested for internal bond and the results were compared against original internal bond values and the other four samples that are the same age, but were only exposed to 70° F./50% R.H. for the testing period. The following procedure for preparing the particleboard was followed for this example.

Six hundred (600) parts of the Autoset 525 U/F resin, Autoset 509 U/F resin, and the resin of Example 1 (referred to as 1.17, 1.25 and 1.00 F/U mole ratio resins, i.e. F:U of 1.17:1, 1.25:1 and 1:1, respectively hereinafter) were sprayed onto 5025 parts of Southern Yellow Pine Core containing approximately 6.7% moisture, 0.75% wax, and the resulting mixture was pressed into boards with dimensions measuring ⅝"×14½" square. A fourth resin was prepared by adding 60 parts of a 20% ammonium chloride solution to 600 parts of the 1.0 mole ratio base resin. This fourth externally catalyzed resin was sprayed under the same conditions. A platen temperature of 340° F. was used along with two total press cycles of 3.00 and 3.75 minutes for all four adhesive formulations.

The test results from the 3.00 minutes press cycle are shown in Tables II and IV and the results of the 3.75 minute press cycle are shown in Tables III and V.

TABLE II

Evaluation of Two Conventional Internal Catalyzed Resins with the Hydrolytically Stable 1.0 Mole Ratio Base Resin (3.00 Minute Press Cycle at 340° F. with Southern Yellow Pine Core)

| | Board | | | |
|---|---|---|---|---|
| | A4 | B4 | C4 | D4 |
| Resin Mole Ratio (F/U) | 1.25 | 1.17 | 1.00 | 1.00 |
| Furnish Moisture Content (M.C.), % | 6.80 | 6.80 | 6.50 | 5.70 |
| Resin Application, % of O.D. Wood | 8.00 | 8.00 | 8.00 | 8.00 |
| Internal Catalyst | Yes | Yes | No | No |
| External Catalyst, Solids, Pts/100g of liquid Resin; 20% NH4CL | — | — | — | 2.00 |
| Wax Application, % of O.D. Wood | 0.75 | 0.75 | 0.75 | 0.75 |
| Treated Furnish Moisture Content | 12.00 | 11.50 | 10.90 | 11.50 |
| Physical Properties (⅝") | | | | |
| Density; #/Ft³, Ovendried | 44.90 | 44.90 | 44.80 | 44.80 |
| Internal Bonds, PSI | 162.00 | 137.00 | 144.00 | 82.00 |
| Residual Formaldehyde (2 Hr.) | | | | |
| Desiccator Value, μg/ml | 1.6 | .8 | .5 | .4 |
| M.C. Before, % | 6.8 | 7.0 | 6.2 | 6.0 |
| M.C. After, % | 6.8 | 7.0 | 6.2 | 5.6 |

TABLE III

Evaluation of Two Conventional Internal Catalyzed Resins with the Hydrolytically Stable 1.0 Mole Ratio Base Resin (3.75 Minute Press Cycle at 340° F. with Southern Yellow Pine Core)

| | Board | | | |
|---|---|---|---|---|
| | A1 | B1 | C1 | D1 |
| Resin Mole Ratio (F/U) | 1.25 | 1.17 | 1.00 | 1.00 |
| Furnish Moisture Content (M.C.), % | 6.80 | 6.80 | 6.50 | 5.70 |
| Resin Application % of O.D. wood | 8.00 | 8.00 | 8.00 | 8.00 |
| Internal Catalyst | Yes | Yes | No | No |
| External Catalyst, Solids, Pts/100g of liquid Resin; 20% NH4CL | — | — | — | 2.00 |
| Wax Application, % of O.D. wood | 0.75 | 0.75 | 0.75 | 0.75 |
| Treated Furnish | 12.00 | 11.50 | 10.90 | 11.50 |

TABLE III-continued

Evaluation of Two Conventional Internal Catalyzed Resins
with the Hydrolytically Stable 1.0 Mole Ratio Base Resin
(3.75 Minute Press Cycle at 340° F.
with Southern Yellow Pine Core)

|  | Board | | | |
|---|---|---|---|---|
|  | A1 | B1 | C1 | D1 |
| Moisture Content | | | | |
| Physical Properties (⅜") | | | | |
| Density; #/Ft³, Ovendried | 44.70 | 46.00 | 44.80 | 45.10 |
| Internal Bonds, PSI | 168.00 | 155.00 | 132.00 | 89.00 |
| Residual Formaldehyde (2 Hr.) | | | | |
| Desiccator Value, µg/ml | 1.4 | .8 | .5 | .4 |
| M.C. Before, % | 6.4 | 6.4 | 6.4 | 5.8 |
| M.C. After, % | 6.5 | 6.4 | 6.4 | 5.8 |

TABLE IV

Heat Degradation Study on the Hydrolytically
Stable 1.0 Mole Ratio Resin (3.00 Minute Press Cycle)

|  | Board | | | |
|---|---|---|---|---|
|  | A4 | B4 | C4 | D4 |
| Resin Mole Ratio (F/U) | 1.25 | 1.17 | 1.00 | 1.00 |
| External Catalyst, % based on liquid resin | — | — | — | 2.00 |
| Internal Bond, PSI | | | | |
| Original No Conditioning | 162.00 | 137.00 | 144.00 | 82.00 |
| 48 Hr. Dry Heat (145° F.) | 136.00 | 107.00 | 99.00 | 75.00 |
| % Gain (Loss) to Original | (16.0) | (21.9) | (31.3) | (8.5) |
| 96 Hr. Heat/Humidity 120° F./70% R.H. | 123.00 | 140.00 | 120.00 | 77.00 |
| % Gain (Loss to Original) | (24.1) | 2.20 | (16.7) | (6.1) |

TABLE V

Heat Degradation Study on the Hydrolytically
Stable 1.0 Mole Ratio Resin (3.75 Minute Press Cycle)

|  | Board | | | |
|---|---|---|---|---|
|  | A1 | B1 | C1 | D1 |
| Resin Mole Ratio (F/U) | 1.25 | 1.17 | 1.00 | 1.00 |
| External Catalyst, % based on liquid resin | — | — | — | 2.00 |
| Internal Bond, PSI | | | | |
| Original No Conditioning | 168.00 | 155.00 | 132.00 | 89.00 |
| 48 Hr. Dry Heat (145° F.) | 127.00 | 101.00 | 113.00 | 63.00 |
| % Gain (Loss) to Original | (24.4) | (34.8) | (14.4) | (29.2) |
| 96 Hr. Heat/Humidity 120° F./70% R.H. | 133.00 | 122.00 | 131.00 | 79.00 |
| % Gain (Loss to Original) | (20.8) | (21.3) | (0.8) | (11.2) |

Table II shows that the catalyzed 1.0 mole ratio resin (D4) has reduced formaldehyde emissions to an average of 0.4 µg/ml. This reduction is approximately 50% lower than the conventional lowest fuming 1.17 mole ratio resin at an average of 0.8 µg/ml (B4). The uncatalyzed resin of Example 1 (or base resin) (C4) had slightly higher residual formaldehyde (0.5 µg/ml), however, the internal bond strength was 62 psi greater than the catalyzed base resin.

In addition to the low-fuming character and high bond strength of the uncatalyzed base resin, it has practical application for the durability of the urea-formaldehyde polymer bond. It is generally accepted that the durability of UF/wood bonds is limited by the hydrolytic susceptibility of the UF adhesive and that this is aggravated by the acidic cure catalysts employed. The uncatalyzed base resin will, therefore, allow the manufacture of a hydrolytically stable particleboard with good bond strength, low residual formaldehyde and stability over time against possible acid hydrolysis.

Table III shows that the 3.75 minute press cycle did not change the residual formaldehyde in the two base resins (C4 and D4, Table II). The range of residual formaldehyde was 0.3 to 0.6 µg/ml. The two conventional resins showed a slight reduction. However, the 1.17 mole ratio resin had residual readings 60% greater than the uncatalyzed formula (C4). The internal bonds increased for all but the uncatalyzed base resin, C4, and this reduction was insignificant.

The heat degradation studies in Tables IV and V show a loss in strength relative to the original internal bonds in all cases except for the 1.17 mole ratio resin (B4) at the 96 hour test with a 3.00 minute press cycle. The uncatalyzed base resin in both the 3.00 and 3.75 minute press cycles shows acceptable bond strength at 120 and 131 psi respectively, and there is no evidence of potential heat degradation of the internal bonds.

In a similar procedure, a base resin having a molar ratio of 1.2:1 prepared as described in copending application Ser. No. 416,573 was compared with the 1.17 molar ratio resin. The results are shown in Tables VI and VII and are similar to the results shown in Tables II-V.

TABLE VI

Evaluation of a Conventional Internal Catalyzed Resin with
the Hydrolytically Stable 1.2:1 Mole Ratio Base
Resin (Press Cycle at 340° F. with Southern Yellow Pine Core)

|  | Board | | | |
|---|---|---|---|---|
|  | A1 | A2 | B1 | B2 |
| Press Cycle (Min.) | 3.00 | 3.75 | 3.00 | 3.75 |
| Resin Mole Ratio (F/U) | 1.17 | 1.17 | 1.20 | 1.20 |
| Furnish Moisture Content (M.C.), % | 3.70 | 3.70 | 4.00 | 4.00 |
| Resin Application, % of O.D. Wood | 8.00 | 8.00 | 8.00 | 8.00 |
| Internal Catalyst | Yes | Yes | No | No |
| External Catalyst, Solids, Pts/100g of liquid Resin; 20% NH₄CL | — | — | — | — |
| Wax Application, % of O.D. Wood | 0.75 | 0.75 | 0.75 | 0.75 |
| Treated Furnish Moisture Content | 8.30 | 8.30 | 8.80 | 8.80 |
| Physical Properties (⅜") | | | | |
| Density; #/Ft³, Ovendried | 46.70 | 46.80 | 47.70 | 46.60 |
| Internal Bonds, PSI | 166.00 | 153.00 | 78.00 | 105.00 |
| Residual Formaldehyde (2 Hr.) | | | | |
| Desiccator Value, µg/ml | 0.58 | 0.48 | 0.44 | 0.36 |
| M.C. Before, % | 4.70 | 4.20 | 4.60 | 4.10 |
| M.C. After, % | 4.80 | 4.20 | 4.70 | 4.20 |

TABLE VII

Heat Degradation Study on the
Hydrolytically Stable 1.2 Mole Ratio Resin

|  | Board | | | |
|---|---|---|---|---|
|  | A1 | A2 | B1 | B2 |
| Press Cycle (min.) | 3.00 | 3.75 | 3.00 | 3.75 |
| Resin Mole Ratio (F/U) | 1.17 | 1.17 | 1.20 | 1.20 |
| External Catalyst, % based on liquid resin | — | — | — | — |
| Internal Bond, PSI | | | | |
| Original No Conditioning | 166.00 | 153.00 | 78.00 | 105.00 |
| 48 Hr. Dry Heat (145° F.) | 112.00 | 121.00 | 79.00 | 93.00 |
| % Gain (Loss) to Original | (32.5) | (20.9) | 1.3 | (11.4) |
| 96 Hr. Heat/Humidity 120° F./70% R.H. | 105.00 | 115.00 | 47.00 | 80.00 |
| % Gain (Loss to Original) | (36.7) | (24.8) | (39.7) | (23.8) |

EXAMPLE 3

Comparative Demonstration of Particleboard Production Using Cross-Linking Agents Although the resin formulation of Example 1 is acceptable for many industrial uses of particleboard, some applications require resins with higher internal bond strength. The internal bond strength can be increased using various cross-linking agents. In the examples which follow the base resin of Example 1 was utilized with and without cross-linking agents to prepare particleboard. Particleboard was made and tested as described above. The following procedures for preparing the particleboard were followed for this example.

(A) Use of TMMM as Cross-Linking Agent

Six hundred (600) parts of a urea-formaldehyde base resin prepared according to Example 1 containing 63% solids was mixed with 15 parts trimethoxymethylmelamine (TMMM) and 0.6 parts Dowfax 2A1. The compounds were mechanically stirred until a homogeneous resin formulation was obtained.

A second formulation was also prepared with an external catalyst. The base resin, six hundred (600) parts, was thoroughly mixed with 15 parts TMMM and 0.6 parts Dowfax 2A1. After a homogeneous resin was obtained, 10 parts of a 20% ammonium chloride per 100 parts of resin formulation was prepared in order to evaluate the effect of an external catalyst.

The resulting adhesives were sprayed onto 5010 parts of Southern Yellow Pine core containing approximately 6.0% moisture, 0.75% wax, and the resulting mixture was pressed into boards with the dimensions ⅝″ × 14½″ × 14½. A platen temperature of 340° F. was used along with two total press cycles of 3.00 and 3.75 minutes. The particleboard was analyzed as described above and the results are shown in Tables VIII and IX.

TABLE VIII

The Evaluation of Trimethoxymethylmelamine (TMMM) as a Cross-Linking Agent with the Hydrolytically Stable 1.0 Mole Ratio Resin (3.75 Minute Press Cycle at 340° F. with Southern Yellow Pine Core)

| | Board | | | |
|---|---|---|---|---|
| | C1 | D1 | E1 | F1 |
| Furnish Moisture Content, % | 6.5 | 5.7 | 6.0 | 6.3 |
| Resin Application, % of O.D. wood | 8.0 | 8.0 | 8.0 | 8.0 |
| Catalyst, Solids, Pts/100g Resin; 20% NH₄Cl | — | 2.0 | — | 2.0 |
| Wax Application, % of O.D. wood | .75 | .75 | .75 | .75 |
| Treated Furnish Moisture Content | 10.9 | 11.5 | 11.0 | 12.2 |
| TMMM, % (based on liquid resin) | 0 | 0 | 2.5 | 2.5 |
| Physical Properties (⅝″) | | | | |
| Density; #/Ft³, Ovendried | 44.8 | 45.1 | 45.6 | 45.0 |
| Internal Bonds, PSI | 132 | 89 | 169 | 131 |
| Residual Formaldehyde | | | | |
| Desiccator Value, µg/ml | .5 | .4 | .5 | .4 |
| M.C. Before, % | 6.3 | 5.9 | 5.0 | 5.5 |
| M.C. After, % | 6.4 | 5.9 | 5.1 | 5.6 |

TABLE IX

The Evaluation of Trimethoxymethylmelamine (TMMM) as a Cross-Linking Agent with the Hydrolytically Stable 1.0 Mole Ratio Resin (3.00 Minute Press Cycle at 340° F. with Southern Yellow Pine Core)

| | Board | | | |
|---|---|---|---|---|
| | C4 | D4 | E4 | F4 |
| Furnish Moisture Content, % | 6.5 | 5.7 | 6.0 | 6.3 |
| Resin Application, % of O.D. wood | 8.0 | 8.0 | 8.0 | 8.0 |
| Catalyst, Solids, Pts/100g Resin; 20% NH₄Cl | — | 2.0 | — | 2.0 |
| Wax Application, % of O.D. wood | .75 | .75 | .75 | .75 |
| Treated Furnish Moisture Content | 10.9 | 11.5 | 11.0 | 12.2 |
| TMMM, % (based on liquid resin) | 0 | 0 | 2.5 | 2.5 |
| Physical Properties (⅝″) | | | | |
| Density; #/Ft³, Ovendried | 44.8 | 43.8 | 45.3 | 45.8 |
| Internal Bonds, PSI | 144 | 82 | 153 | 121 |
| Residual Formaldehyde | | | | |
| Desiccator Value, µg/ml | .5 | .4 | .5 | .4 |
| M.C. Before, % | 6.2 | 6.0 | 5.8 | 5.8 |
| M.C. After, % | 6.2 | 6.1 | 5.8 | 6.1 |

Comparison of the boards made from the same materials by the same methods, except that the external catalyst was omitted, shows that in all cases, the internal bonds with the cross-linking agents were greater than those without the agent (Tables VI and VII). In addition, the uncatalyzed boards with cross-linking agent have higher internal bonds than the externally catalyzed boards.

For example, the internal boards for the 3.00 minute press cycle uncatalyzed resin (E4, Table VII) was 153 psi, whereas, the catalyzed resin (F4) had 121 psi. At the 3.75 minute press cycle, the results were 169 and 131 psi respectively (Table VI). No change was seen in residual formaldehyde.

The effect of the trimethoxymethylmelamine is most evident at the 3.75 minute press cycle. The I.B.'s increase from 132 psi to 169 psi or 28% for the uncatalyzed resin, and 47% for the catalyzed formulation; 89 psi to 131 psi.

(B) Comparison of TMMM and HMMM as Cross-Linking Agents

TMMM was compared with a second cross-linking agent hexmethoxymethylmelamine (HMMM). One thousand two hundred (1200) parts of the urea-formaldehyde base resin prepared according to Example 1 containing 63% solids was mixed with 60 parts of either TMMM or HMMM and 1.2 parts Dowfax 2A1. Each of the two formulations were thoroughly mixed until a homogeneous mixture was obtained. Each formulation was divided into two equal parts and 60 parts of a 20% ammonium chloride solution was added to one as an external catalyst. The remaining half was used as an uncatalyzed resin.

The four adhesive formulations were sprayed onto 5025 parts of Southern Yellow Pine core containing approximately 6.2% moisture, 0.75% wax, and the resulting mixture was pressed into boards with the dimensions ⅝″ × 14½″ × 14½″. A platen temperature of 340° F. was used along with two total press cycles of 3.00 and 3.75 minutes. The particleboard was analyzed as described above and the results are shown in Tables X-XIII.

TABLE X

The Evaluation of Hexamethoxymethylmelamine (HMMM) and Trimethoxymethylmelamine (TMMM) as a 5% Cross-Linking Agent with the Hydrolytically Stable 1.0 Mole Ratio Resin (3.00 Minute Press Cycle at 340° F. with Southern Yellow Pine Core)

| | Board | | | |
|---|---|---|---|---|
| | G4 | H4 | I4 | J4 |
| Cross-Linking Agent | TMMM | TMMM | HMMM | HMMM |
| Furnish Moisture Content, % | 6.2 | 6.2 | 6.7 | 6.8 |
| Resin Application, % of O.D. wood | 8.0 | 8.0 | 8.0 | 8.0 |
| Catalyst, Solids, Pts/100g Resin; 20% NH4Cl | — | 2.0 | — | 2.0 |
| Wax Application, % of O.D. wood | .75 | .75 | .75 | .75 |
| Treated Furnish Moisture Content | 11.5 | 12.1 | 12.4 | 13.4 |
| Physical Properties (⅜") | | | | |
| Density; #/Ft³, Ovendried | 45.2 | 46.1 | 44.8 | 44.8 |
| Internal Bonds, PSI | 140 | 101 | 108 | 89 |
| Residual Formaldehyde | | | | |
| Desiccator Value, μg/ml | .5 | .4 | .7 | .5 |
| M.C. Before, % | 6.0 | 6.2 | 6.5 | 6.6 |
| M.C. After, % | 6.0 | 6.3 | 6.5 | 6.6 |

TABLE XI

The Evaluation of Hexamethoxymethylmelamine (HMMM) and Trimethoxymethylmelamine (TMMM) as a 5% Cross-Linking Agent with the Hydrolytically Stable 1.0 Mole Ratio Resin (3.75 Minute Press Cycle at 340° F. with Southern Yellow Pine Core)

| | Board | | | |
|---|---|---|---|---|
| | G1 | H1 | I1 | J1 |
| Cross-Linking Agent | TMMM | TMMM | HMMM | HMMM |
| Furnish Moisture Content, % | 6.2 | 6.2 | 6.7 | 6.8 |
| Resin Application, % of O.D. wood | 8.0 | 8.0 | 8.0 | 8.0 |
| Catalyst, Solids, Pts/100g Resin; 20% NH4Cl | — | 2.0 | — | 2.0 |
| Wax Application, % of O.D. wood | .75 | .75 | .75 | .75 |
| Treated Furnish Moisture Content | 11.5 | 12.1 | 12.4 | 13.4 |
| Physical Properties (⅜") | | | | |
| Density; #/Ft³, Ovendried | 45.2 | 45.5 | 44.7 | 45.0 |
| Internal Bonds, PSI | 163 | 156 | 173 | 124 |
| Residual Formaldehyde | | | | |
| Desiccator Value, μg/ml | .4 | .4 | .6 | .5 |
| M.C. Before, % | 5.2 | 6.0 | 5.8 | 6.2 |
| M.C. After, % | 5.2 | 6.0 | 5.8 | 6.3 |

TABLE XII

Heat Degradation Study of the 5% Use of TMMM and HMMM Cross-Linking Agents (3.75 Minute Press Cycle)

| | Board | | | |
|---|---|---|---|---|
| | G1 | H1 | I1 | J1 |
| Cross-linking Agent | TMMM | TMMM | HMMM | HMMM |
| External Catalyst, % based on liquid resin | — | 2.0 | — | 2.0 |
| Internal Bond, PSI | | | | |
| Original | 163 | 156 | 173 | 124 |
| No Conditioning 48 Hr. Dry Heat (145° F.) | 167 | 122 | 140 | 132 |
| % Gain (Loss) to Original | 2.5 | (21.8) | (19.1) | (6.5) |
| 96 Hr. Heat/Humidity 120° F./70% R.H. | 167 | 135 | 191 | 113 |
| % Gain (Loss) to Original | 2.5 | (13.5) | (10.4) | (15.3) |

TABLE XIII

Heat Degradation Study of the 5% Use of TMMM and HMMM Cross-Linking Agents (3.00 Minute Press Cycle)

| | Board | | | |
|---|---|---|---|---|
| | G4 | H4 | I4 | J4 |
| Cross-linking Agent | TMMM | TMMM | HMMM | HMMM |
| External Catalyst, % based on liquid resin | — | — | — | — |
| Internal Bond, PSI | | | | |
| Original | 140 | 101 | 108 | 89 |
| No Conditioning 48 Hr. Dry Heat (145° F.) | 125 | 107 | 116 | 109 |
| % Gain (Loss) to Original | (10.7) | 5.9 | 7.4 | 22.5 |
| 96 Hr. Heat/Humidity 120° F./70% R.H. | 158 | 119 | 113 | 80 |
| % Gain (Loss) to Original | 12.9 | 17.8 | 4.6 | (10.1) |

Table X compares the results of the 3.00 minute press cycle. Both the catalyzed and uncatalyzed base resin formulated with 5% TMMM gave greater internal bond strengths and lower residual formaldehyde in the final boards. The results were mixed in the 3.75 minute press cycle (Table XI). The HMMM uncatalyzed base resin had a slightly greater, if not equal, bond strength (173 psi) than the TMMM resin at 163 psi. When the HMMM modified base resin was externally catalyzed, however, the internal bond results were lower than the TMMM modified resin; 124 psi and 156 psi respectively.

Tables XII and XIII show the results from tests performed on boards made from both the 3.75 and 3.00 minute press cycles.

The effect of dry stack heat degradation was tested, since low mole ratio resins are known to be more susceptible to bond degradation.

The results show that heat degradation is not a problem. In fact, there is an increase in bond strength in three of the four boards made with the 3.00 minute press cycle. The 3.75 minute cycle showed a slight loss in strength with a range of 10.4% to 15.3% for the 96 hour period. These losses are minimal, however, and are not expected to effect the performance of the manufactured board.

EXAMPLE 4

Identification of Additional Cross-Linking Agents

A boiling water gel (BWG) test method was used to screen potential cross-linking agents prior to the actual board manufacture. The reactivity of the resin was tested under controlled conditions by observing the increase in viscosity until gelation occurs.

The resin, a catalyst if used, and the cross-linking agent were mixed according to the required formulation and held at 70° F. for 10 minutes. Four mls of the resin formulation were then poured into each of three test tubes. A test tube was placed in boiling water that is deep enough to be slightly above the level of the resin in the tube. A timer was started and the resin was continually stirred with a small stick or glass rod until the resin sets. The BWG is the time elapsed between placing the tube in the boiling water and setting up of the resin. The BWG is the average of the three samples, and an average value between 60 and 180 seconds was found to be an acceptable guideline for screening potential cross-linking formulations as determined for HMMM and TMMM.

Several other compounds were tested with the BWG procedure and found to be acceptable cross-linking agents. These included:

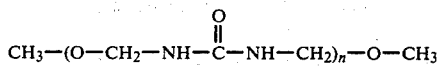

wherein n=1–6, dimethoxymethyldihydroxyethylene urea, tetraethoxymethylglycoluril, dibutoxymethylurea, 5-ethyl-1-aza-3,7-dioxabicyclo[3,3,0]octane and 5-hydroxymethyl-1-aza-3,7-dioxabicyclo[3,3,0]octane.

A urea-formaldehyde resin is the material of choice for use in the present invention. However, other amino compounds that combine with formaldehyde may also be utilized. Examples of other suitable amino compounds include melamine, methyl urea, 1,3-dimethyl urea, ethyl urea and the like. If used, such compounds preferably are used as partial replacement for the urea. Although the above examples utilized urea, it is understood that these other amino-formaldehyde base resins prepared by the process described in Example 1 can be utilized for making particleboard.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A process for bonding lignocellulosic material under heat and pressure, where the bonded lignocellulosic material is characterized by a low emission of formaldehyde, which comprises
    applying a binder to said lignocellulosic material, said binder comprising a urea-formaldehyde base resin having a molar ratio of formaldehyde to urea of 1.0:1–1.2:1, said base resin having essentially no free formaldehyde and said base resin when cured containing substantially more methylene groups than methylene ether groups,
    consolidating said lignocellulosic material and curing the binder.

2. The process of claim 1 wherein the molar ratio of the base resin is substantially 1:1.

3. The process of claim 2 wherein said base resin comprises 24.89 weight percent formaldehyde and 49.78 weight percent urea.

4. The process of claim 3 wherein said base resin further comprises 0.06 weight percent sulfuric acid, 0.05 weight percent sodium hydroxide and 0.33 weight percent triethanolamine, the balance comprising water.

5. The process of claim 1 or 2 wherein said binder further comprises a cross-linking agent.

6. The process of claim 5 wherein the cross-linking agent is selected from the group comprising trimethoxymethylmelamine, hexamethoxymethylmelamine,

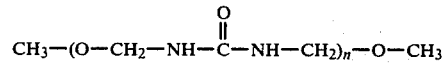

where n=1–6; dimethoxymethyldihydroxyethylene urea, tetraethoxymethylglycoluril, dibutoxymethylurea, 5-ethyl-1-aza-3,7-dioxabicyclo[3,3,0]octane and 5-hydroxymethyl-1-aza-3,7-dioxabicyclo[3,3,0]octane.

7. The process of claim 6 wherein the cross-linking agent is trimethoxymethylmelamine or hexamethoxymethylmelamine.

8. The process of claim 7 which additionally contains an acid catalyst.

9. An improved pressed composite of lignocellulosic material bound together by a urea-formaldehyde binder, which composite is characterized by reduced emission of formaldehyde, wherein the improvement comprises using as said binder a urea-formaldehyde base resin having a molar ratio of formaldehyde to urea of 1.0:1–1.2:1, said base resin having no free formaldehyde and said base resin when cured contains substantially more methylene groups then methylene ether groups.

10. The improved process of claim 9 wherein the molar ratio of said base resin is substantially 1:1.

11. The composite of claim 10 wherein said base resin comprises 24.89 weight percent formaldehyde and 49.78 weight percent urea.

12. The composite of claim 11 wherein said base resin further comprises 0.06 weight percent sulfuric acid, 0.05 weight percent sodium hydroxide and 0.33 weight percent triethanolamine, the balance comprising water.

13. The composite of claim 9 or 10 wherein said binder further comprises a cross-linking agent.

14. The composite of claim 13 wherein said cross-linking agent is selected from the group comprising trimethoxymethylmelamine, hexamethoxymethylmelamine,

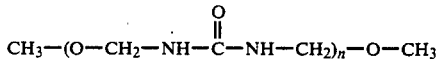

where n=1–6, dimethoxymethyldihydroxyethylene urea, tetraethoxymethylglycoluril, dibutoxymethylurea, 5-ethyl-1-aza-3,7-dioxabicyclo[3,3,0]octane and 5-hydroxymethyl-1-aza-3,7-dioxabicyclo[3,3,0]octane.

15. The composite of claim 14 wherein said cross-linking agent is trimethoxymethylmelamine or hexamethoxymethylmelamine.

16. The composite of claim 15 wherein said binder additionally contains an acid catalyst.

17. A process for adhesively securing a first item to a second using a curable urea-formaldehyde resin, comprising
    disposing between a first item and a second item a curable urea-formaldehyde resin having a molar ratio of formaldehyde to urea of 1.0:1–1.2:1, said resin containing essentially no free formaldehyde and being curable to a structure containing substantially more methylene groups than methylene ether groups, and then curing said resin to bind said items together.

18. The process of claim 17 wherein the molar ratio of said resin is substantially 1:1.

19. The process of claim 18 wherein said resin is the reaction product of about 0.55 mole of urea per mole of formaldehyde with a neutral urea-formaldehyde solution having a pH of 7.2–7.5, said urea-formaldehyde solution prepared by reacting about 0.28 moles of urea per mole of formaldehyde with an acidified formaldehyde solution having a pH of 0.5–2.5 and then neutralizing the reaction solution.

20. The process of claim 19 wherein said resin comprises 24.89 weight percent formaldehyde, 49.78 weight percent urea, 0.06 weight percent sulfuric acid, 0.05 weight percent sodium hydroxide and 0.33 weight percent triethanolamine, the balance comprising water.

21. The process of claim 17 or 18 including a preliminary step, prior to dispersing said resin, of mixing a cross-linking agent with said resin.

22. The process of claim 21 wherein said cross-linking agent is selected from the group comprising trimethoxymethylmelamine, hexamethoxymethylmelamine,

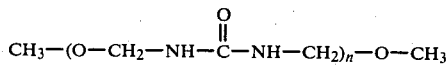

where n=1–6, dimethoxymethyldihydroxyethylene urea, tetraethoxymethylglycoluril, dibutoxymethylurea, 5-ethyl-1-aza-3,7-dioxabicyclo[3,3,0]octane and 5-hydroxymethyl-1-aza-3,7-dioxabicyclo[3,3,0]octane.

23. A process for bonding lignocellulosic material under heat and pressure, where the bonded lignocellulosic material is characterized by a low emission of formaldehyde, which comprises applying a binder to said lignocellulosic material, said binder comprising a amino-formaldehyde base resin having a molar ratio of formaldehyde to amino compound of 1.0:1–1.2:1, said base resin having essentially no free formaldehyde and said base resin when cured containing substantially more methylene groups than methylene ether groups, consolidating said lignocellulosic material and curing the binder.

24. The process of claim 23 wherein the base resin is an urea-melamine-formaldehyde base resin.

25. The process of claim 23 or 24 wherein said binder further comprises a cross-linking agent.

26. An improved pressed composite of lignocellulosic material bound together by a urea-formaldehyde binder, which composite is characterized by reduced emission of formaldehyde, wherein the improvement comprises using as said binder a amino-formaldehyde base resin having a molar ratio of formaldehyde to amino compound of 1.0:1–1.2:1, said base resin having no free formaldehyde and said base resin when cured contains substantially more methylene groups then methylene ether groups.

27. The composite of claim 26 wherein the base resin is an urea-melamine-formaldehyde base resin.

28. The composite of claim 26 or 27 wherein said binder further comprises a cross-linking agent.

29. A process for adhesively securing a first item to a second using a curable urea-formaldehyde resin, comprising disposing between a first item and a second item a curable amino-formaldehyde resin having a molar ratio of formaldehyde to amino compound of 1.0:1–1.2:1, said resin containing essentially no free formaldehyde and being curable to a structure containing substantially more methylene groups than methylene ether groups, and then curing said resin to bind said items together.

30. The process of claim 29 wherein the resin is a urea-melamine-formaldehyde resin.

31. The process of claim 29 or 30 including a preliminary step, prior to dispersing said resin, of mixing a cross-linking agent with said resin.

* * * * *